US012767445B2

(12) United States Patent
Namazue et al.

(10) Patent No.: US 12,767,445 B2
(45) Date of Patent: Oct. 20, 2026

(54) ARTICLE ACCOMMODATION FACILITY

(71) Applicant: Daifuku Co., Ltd., Osaka (JP)

(72) Inventors: Kazuya Namazue, Hinocho (JP); Kenji Tamura, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 498 days.

(21) Appl. No.: 18/216,712

(22) Filed: Jun. 30, 2023

(65) Prior Publication Data

US 2024/0002154 A1 Jan. 4, 2024

(30) Foreign Application Priority Data

Jul. 1, 2022 (JP) ................................ 2022-107318

(51) Int. Cl.
*B65G 1/137* (2006.01)

(52) U.S. Cl.
CPC ................................. *B65G 1/1375* (2013.01)

(58) Field of Classification Search
CPC .. B65G 1/1375; B65G 1/0485; B65G 1/0407; H01L 21/67769; H01L 21/6773; H01L 21/67718; H01L 21/67736
See application file for complete search history.

(56) References Cited

U.S. PATENT DOCUMENTS

| | | | | | |
|---|---|---|---|---|---|
| 5,651,426 | A * | 7/1997 | Bittar | B66B 1/2491 187/382 |
| 9,245,782 | B2 * | 1/2016 | Yoshioka | H01L 21/68707 |
| 9,815,624 | B2 * | 11/2017 | Yoshioka | H01L 21/67727 |
| 11,348,812 | B2 * | 5/2022 | Kuwahara | H01L 21/67184 |
| 12,139,336 | B2 * | 11/2024 | Austrheim | B65G 1/0464 |
| 2017/0183156 | A1 * | 6/2017 | Yoshioka | B65G 1/137 |
| 2024/0294337 | A1 * | 9/2024 | Sebe | B65G 1/1375 |

FOREIGN PATENT DOCUMENTS

| | | | | |
|---|---|---|---|---|
| EP | 4737356 | A1 * | 5/2026 | B65G 1/065 |
| JP | 200312112 | A | 1/2003 | |
| JP | 2009292582 | A | 12/2009 | |
| JP | 201724840 | A | 2/2017 | |
| JP | 2017114618 | A | 6/2017 | |

* cited by examiner

*Primary Examiner* — Patrick H Mackey
(74) *Attorney, Agent, or Firm* — The Webb Law Firm

(57) ABSTRACT

The article accommodation facility includes a first stacker crane disposed at a first level, a second stacker crane disposed at a second level, and a storage rack. The storage rack extends across the first level and the second level. The storage rack has a common area that includes at least one accommodation section to and from which an article is carriable from two sides in a second direction. The first stacker crane is configured to transfer the article to the accommodation section in the common area from a first side in the second direction, and the second stacker crane is configured to transfer the article to the accommodation section in the common area from a second side in the second direction.

7 Claims, 9 Drawing Sheets

ARTICLE ACCOMMODATION FACILITY

CROSS-REFERENCE TO RELATED APPLICATION

This application claims priority to Japanese Patent Application No. 2022-107318 filed Jul. 1, 2022, the disclosure of which is hereby incorporated by reference in its entirety.

BACKGROUND OF THE INVENTION

Field of the Invention

The present invention relates to an article accommodation facility to be installed in a building that has a first floor, which is a floor at a first level, and a second floor, which is a floor at a second level above the first level.

Description of the Related Art

JP 2017-114618A (hereinafter, "Patent Document 1") discloses an example of this type of article accommodation facility. In the following description of the background art, the reference numerals in parentheses are those used in Patent Document 1.

A facility disclosed in Patent Document 1 includes a first guide and a second guide that are disposed in an up-down direction within a cylindrical body extending in the up-down direction. A first movable body is movable in the up-down direction on the first guide. The first movable body has a first transfer apparatus capable of transferring an article. Similarly, a second movable body is movable in the up-down direction on the second guide and has a second transfer apparatus.

A first movement path, which is the path of the first movable body (T1) while moving in the up-down direction, corresponds to a transportable area in which the first movable body (T1) can transport the article (B). A second movement path, which is the path of the second movable body (T2) while moving in the up-down direction, corresponds to a transportable area in which the second movable body (T2) can transport the article (B). The position of an upper end portion of the first movement path in the up-down direction overlaps the position of a lower end portion of the second movement path in the up-down direction. That is, the transportable area of the first movable body (T1) and the transportable area of the second movable body (T2) partially overlap in the up-down direction. Further, relay support platforms (N) are located in an overlapping area, i.e. the area where these transportable areas overlap. The first movable body (T1) and the second movable body (T2) can pass the article (B) to and from each other via a relay support platform (N). Thus, due to the first movable body (T1) and the second movable body (T2) being capable of transporting the same article (B), the article (B) can be transported over a large range in the up-down direction in the facility disclosed in Patent Document 1. This enables the article (B) to be transported across different levels in the facility.

In the facility disclosed in Patent Document 1, the first movable body (T1) overlaps the second movable body (T2) as viewed in the up-down direction, as shown in FIG. 2 of the document. That is, the first movement path of the first movable body (T1) overlaps the second movement path of the second movable body (T2) as viewed in the up-down direction. Interference thus may occur between the first movable body (T1) and the second movable body (T2) in the overlapping area where the transportable area of the first movable body (T1) overlaps the transportable area of the second movable body (T2). For this reason, control is performed to avoid interference between these movable bodies (T1, T2) in the facility disclosed in Patent Document 1. However, this type of interference avoidance control increases constraints on the article transport operation performed by the first movable body (T1) and the second movable body (T2), and constrains the article transport efficiency of the movable bodies.

SUMMARY OF THE INVENTION

In view of the above situation, there is a demand to realize a technology that enables articles to be transported across different levels in the up-down direction and accommodated in accommodation sections at different levels while reducing the constraints on the article transport operation.

A characteristic configuration of an article accommodation facility in view of the above lies in

- an article accommodation facility to be installed in a building having a first floor, which is a floor at a first level, and a second floor, which is a floor at a second level above the first level, the article accommodation facility comprising:
- a first stacker crane disposed at the first level;
- a second stacker crane disposed at the second level; and
- a storage rack including a plurality of accommodation sections arranged in a first direction, which is parallel to a horizontal direction, and in an up-down direction, each of the accommodation sections being capable of accommodating an article,
- wherein the storage rack extends across the first level and the second level,
- the first stacker crane is on a first side relative to the storage rack in a second direction, the first side in the second direction being one side in the second direction orthogonal to the first direction as viewed in the up-down direction,
- the second stacker crane is on a second side relative to the storage rack in the second direction, the second side in the second direction being another side in the second direction,
- the storage rack has a common area that includes at least one accommodation section, of the plurality of accommodation sections, to and from which the article is carriable from the first side and the second side in the second direction,
- the first stacker crane is configured to transfer the article to the at least one accommodation section in the common area from the first side in the second direction, and
- the second stacker crane is configured to transfer the article to the at least one accommodation section in the common area from the second side in the second direction.

According to this configuration, a transportable area of the first stacker crane, which is the area where the first stacker crane can transport the article, and the transportable area of the second stacker crane, which is the area where the second stacker crane can transport the article, are located at different positions in the second direction, and do not overlap each other. Thus, interference does not occur between the first stacker crane and the second stacker crane outside of the accommodation section in the common area, and constraints on the operation of the first stacker crane and the second stacker crane can be reduced. This allows the article transport efficiency of the first stacker crane and the second stacker crane to be easily increased. In this configuration, the first stacker crane can transfer the article to the accommodation section in the common area of the storage rack from the first side in the second direction, and the second stacker crane can transfer the article to the accommodation section in the common area of the storage rack from the second side in the second direction. This enables the first stacker crane and the second stacker crane to pass the article to and from each other, transport the article across different levels, and accommodate the article in any of the accommodation sections at different levels, via the accommodation section in the common area. Here, the first stacker crane and the second stacker crane can transport the article not only in the up-down direction but also in the first direction. The storage rack including a plurality of accommodation sections arranged in the first direction in addition to the up-down direction makes it easier to accommodate more articles in the storage rack than in conventional examples. As described above, this configuration enables the article to be transported across different levels and accommodated in any of the accommodation sections at different levels while reducing constraints on the operation of the first stacker crane and the second stacker crane.

Further features and advantages of the technology according to the present disclosure will become more apparent from the following illustrative and non-limiting description of the embodiments with reference to the drawings.

DESCRIPTION OF THE INVENTION

First Embodiment

Figure 1:
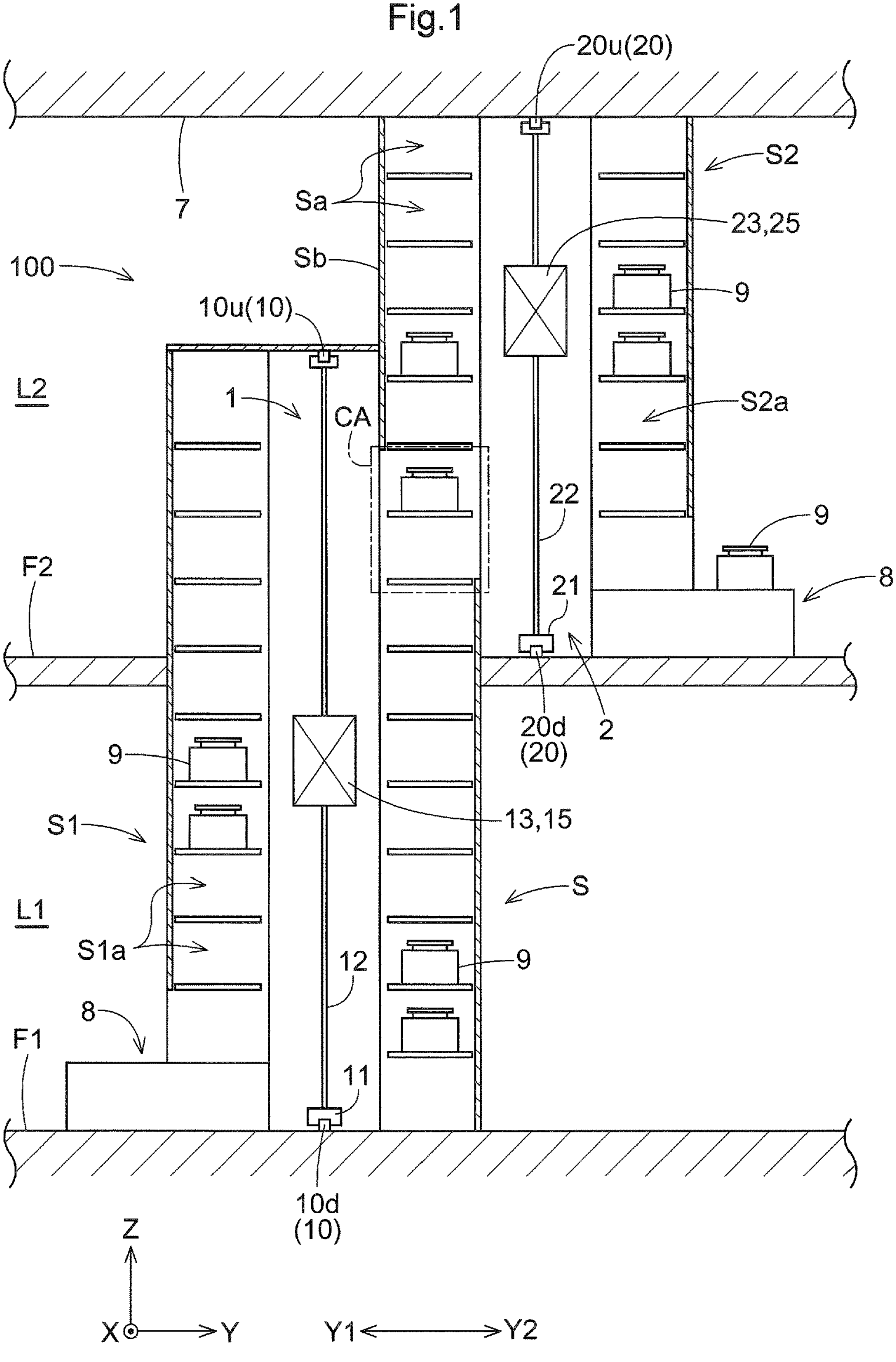
FIG. 1 is a side view of an article accommodation facility.

As shown in FIG. 1, an article accommodation facility 100 is installed in a building that has a first floor F1, which is a floor at a first level L1, and a second floor F2, which is a floor at a second level L2 above the first level L1.

In the following description, a symbol "Z" is appended to the direction in which a plurality of levels are stacked, namely the up-down direction. A "first direction X" refers to a specific direction parallel to the horizontal direction, and a "second direction Y" refers to a direction orthogonal to the first direction X as viewed in the up-down direction Z. The second direction Y in this example is a horizontal direction orthogonal to the first direction X. A "first side Y1 in the second direction Y" refers to one side in the second direction Y, and a "second side Y2 in the second direction Y" refers to the other side in the second direction Y.

Figure 2:
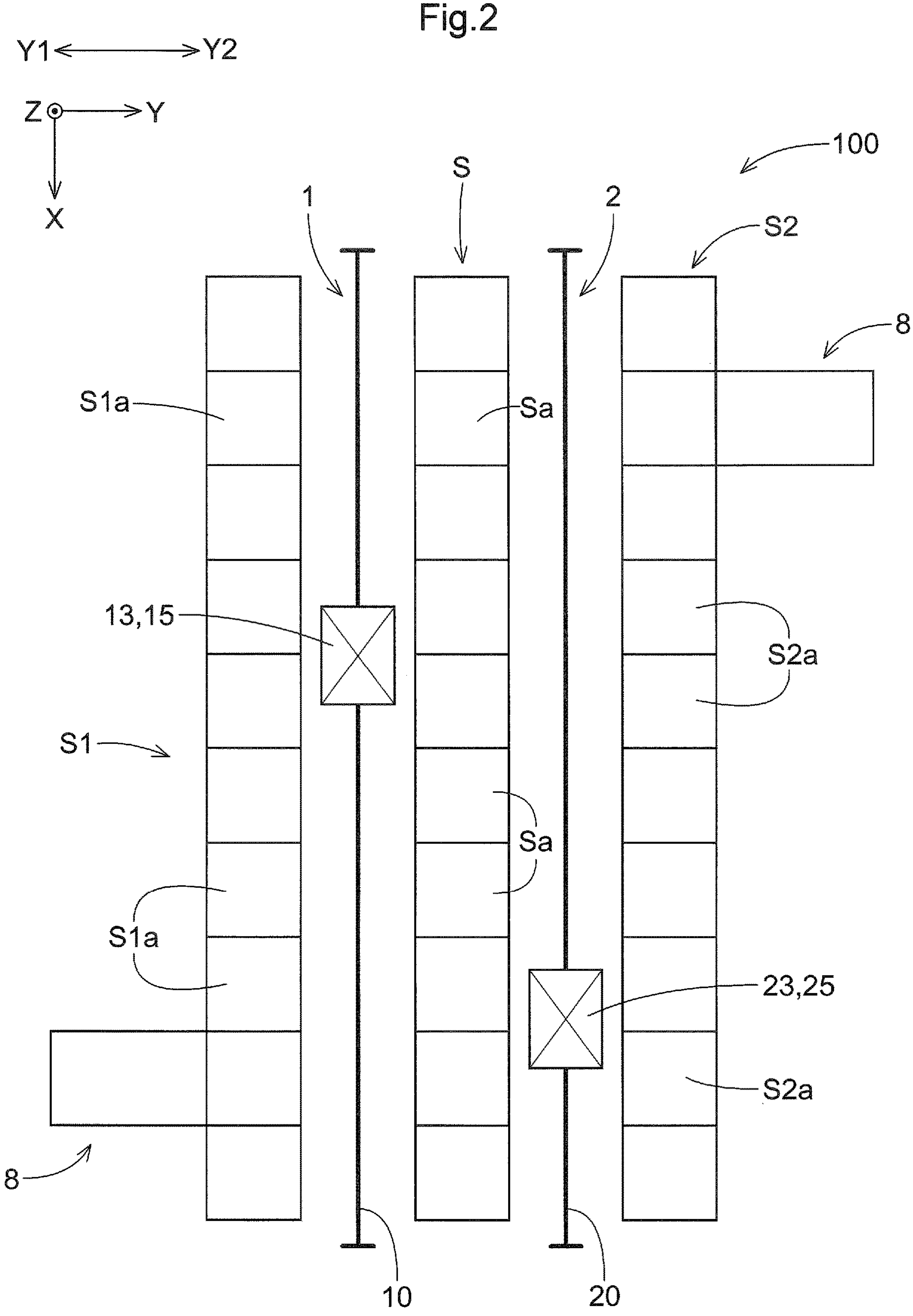
FIG. 2 is a schematic plan view of the article accommodation facility.

The article accommodation facility 100 includes a first stacker crane 1 disposed at the first level L1, a second stacker crane 2 disposed at the second level L2, and a storage rack S, as shown in FIGS. 1 and 2. The first stacker crane 1 and the second stacker crane 2 are transport devices that transport articles 9. Each stacker crane is capable of transporting the articles 9 at the level where the stacker crane is disposed. Note that "a stacker crane being disposed at a certain level" means that the stacker crane is disposed at least at that level. The storage rack S has a plurality of accommodation sections Sa arranged in the first direction X, which is parallel to the horizontal direction, and in the up-down direction Z, and each accommodation section Sa can accommodate an article 9.

Various types of articles 9 may be handled in the article accommodation facility 100. For example, if the article accommodation facility 100 is used in a semiconductor manufacturing plant, the articles 9 may include wafer accommodating containers (so-called FOUPs: Front Opening Unified Pods) for accommodating wafers, and reticle accommodating containers (so-called reticle pods) for accommodating reticles.

The storage rack S extends across the first level L1 and the second level L2. The storage rack S in this embodiment stands upward on the first floor F1 and extends through the second floor F2 in the up-down direction Z. In this example, the storage rack S extends from the first floor F1 to a ceiling 7 of the second level L2. The upper end of the storage rack S need only be located above the second floor F2. For example, the upper end of the storage rack S may be located near or in contact with the ceiling 7, as shown in FIG. 1.

The first stacker crane 1 is located on the first side Y1 in the second direction Y relative to the storage rack S. The first stacker crane 1 is capable of transferring the articles 9 to some of the accommodation sections Sa in the storage rack S from the first side Y1 in the second direction Y.

The second stacker crane 2 is located on the second side Y2 in the second direction Y relative to the storage rack S. The second stacker crane 2 is capable of transferring the articles 9 to some of the accommodation sections Sa in the storage rack S from the second side Y2 in the second direction Y.

The article accommodation facility 100 in this embodiment includes a first rack S1, which is separate from the storage rack S. The first rack S1 has a plurality of first accommodation sections S1*a* arranged in the first direction X and the up-down direction Z, and each first accommodation section S1*a* can accommodate an article 9. The first rack S1 is located on the first side Y1 in the second direction Y relative to the first stacker crane 1.

The first rack S1 in this embodiment extends across the first level L1 and the second level L2. Specifically, the first rack S1 stands upward on the first floor F1 and extends through the second floor F2 in the up-down direction Z. In this example, the first rack S1 and the storage rack S both stand upright on the first floor F1. Thus, a lower end portion of the first rack S1 is located at the same height as a lower end portion of the storage rack S. Meanwhile, an upper end portion of the first rack S1 is located at a position lower than an upper end portion of the storage rack S. In other words, the area in the up-down direction Z occupied by the first rack S1 is smaller than the area in the up-down direction Z occupied by the storage rack S.

The size of the area in the first direction X occupied by the first rack S1 is equal to the size of the area in the first direction X occupied by the storage rack S, in the example shown in FIG. 2. Further, in this example, the size of the area in the first direction X occupied by the first rack S1 is disposed is equal to the size of the area in the first direction X occupied by a later-described second rack S2.

In the example shown in FIG. 2, a loading and unloading section 8 for loading the articles 9 into the first rack S1 and unloading the articles 9 from the first rack S1 is connected to a portion of the first rack S1. The loading and unloading section 8 connected to the first rack S1 transports the articles 9 between the interior and exterior of the first rack S1. For example, the loading and unloading section 8 is constituted by a conveyor, a transport shuttle, or the like. An external transport device (e.g. floor-running unmanned vehicle, overhead transport vehicle, forklifts etc.) or an operator outside the first rack S1 transports the articles 9 to or from the loading and unloading section 8.

The first stacker crane 1 in this embodiment is capable of transferring the articles 9 to the first accommodation sections S1*a* in the first rack S1 from the second side Y2 in the second direction Y. The first stacker crane 1 in this example is also capable of transferring the articles 9 to the loading and unloading section 8, which is connected to the first rack S1.

The article accommodation facility 100 in this embodiment includes a second rack S2, which is separate from the storage rack S. The second rack S2 has a plurality of second accommodation sections S2*a* arranged in the first direction X and the up-down direction Z, and each second accommodation section S2*a* can accommodate an article 9. The second rack S2 is located on the second side Y2 in the second direction Y relative to the second stacker crane 2.

The second rack S2 in this embodiment is located only at the second level L2. Specifically, the second rack S2 stands upward on the second floor F2. An upper end portion of the second rack S2 in this example is located at the same height as the upper end portion of the storage rack S. On the other hand, a lower end portion of the second rack S2 is located higher than the lower end portion of the storage rack S. In other words, the size of the area in the up-down direction Z occupied by the second rack S2 is larger than the size of the area in the up-down direction Z occupied by the storage rack S.

The size of the area in the first direction X occupied by the second rack S2 is equal to the size of the area in the first direction X occupied by the storage rack S, in the example shown in FIG. 2. In this example, the size of the area in the first direction X occupied by the second rack S2 is equal to the size of the area in the first direction X occupied by the aforementioned first rack S1. In other words, in this example, the first rack S1, the storage rack S, and the second rack S2 are equal in terms of the size of the area in the first direction X occupied by each rack.

In the example shown in FIG. 2, a loading and unloading section 8 for loading the articles 9 into the second rack S2 or unloading the articles 9 from the second rack S2 is connected to a portion of the second rack S2. The loading and unloading section 8 connected to the second rack S2 transports the articles 9 between the interior and exterior of the second rack S2. For example, the loading and unloading section 8 is constituted by a conveyor, a transport shuttle, or the like. An external transport device (e.g. floor-running unmanned vehicle, overhead transport vehicle, forklifts etc.) or an operator outside the second rack S2 transports the articles 9 to or from the loading and unloading section 8.

The second stacker crane 2 in this embodiment is capable of transferring the articles 9 to the second accommodation section S2*a* in the second rack S2 from the first side Y1 in the second direction Y. The second stacker crane 2 in this example is also capable of transferring the articles 9 to the loading and unloading section 8, which is connected to the second rack S2.

The first stacker crane 1 in this embodiment includes a first travel rail 10 extending in the first direction X, a first traveling unit 11 that travels along the first travel rail 10, a first mast 12 standing upright on the first traveling unit 11 in the up-down direction Z, a first body 13 supported in such a manner as to be capable of moving up and down relative to the first mast 12, a first elevation unit 14 (see FIG. 4) that raises and lowers the first body 13, and a first transfer unit 15 that is supported by the first body 13 and transfers the articles 9.

The first stacker crane 1 in this embodiment is supported at the first level L1. Specifically, the first stacker crane 1 is supported on the first floor F1. The first travel rail 10 in this example includes a lower rail 10*d* disposed on the first floor F1, and an upper rail 10*u* disposed above the lower rail 10*d*. The first traveling unit 11 is supported by the lower rail 10*d* and travels along the lower rail 10*d*. An upper end portion of the first mast 12 is supported by the upper rail 10*u*.

The area where the first stacker crane 1 can transport the articles 9 in the up-down direction Z corresponds to the area in the up-down direction Z occupied by the first rack S1. Specifically, the area where the first body 13 supporting the first transfer unit 15 can move in the up-down direction Z depends on the dimension of the first mast 12 in the up-down direction Z. The dimension of the first mast 12 in the up-down direction Z corresponds to the area in the up-down direction Z occupied by the first rack S1. Thus, the area where the first stacker crane 1 can transport the articles 9 in the up-down direction Z corresponds to the area in the up-down direction Z occupied by the first rack S1.

In the example shown in FIG. 2, the area where the first stacker crane 1 can transport the articles 9 in the first direction X corresponds to the area in the first direction X occupied by the first rack S1. Specifically, the area where the first body 13 supporting the first transfer unit 15 can move in the first direction X depends on the dimension of the first travel rail 10 in the first direction X. The dimension of the first travel rail 10 in the first direction X corresponds to the area in the first direction X occupied by the first rack S1. Thus, the area where the first stacker crane 1 can transport the articles 9 in the first direction X corresponds to the area in the first direction X occupied by the first rack S1.

The second stacker crane 2 in this embodiment includes a second travel rail extending in the first direction X, a second traveling unit 21 that travels along the second travel rail 20, a second mast 22 standing upright on the second traveling unit 21 in the up-down direction Z, a second body 23 supported in such a manner as to be capable of moving up and down relative to the second mast 22, a second elevation unit 24 (see FIG. 4) that raises and lowers the second body 23, and a second transfer unit 25 that is supported by the second body 23 and transfers the articles 9.

The second stacker crane 2 in this embodiment is supported at the second level L2. Specifically, the second stacker crane 2 is supported on the second floor F2. The second travel rail 20 in this example includes a lower rail 20*d* disposed on the second floor F2, and an upper rail 20*u* disposed above the lower rail 20*d*. The second traveling unit 21 is supported by the lower rail 20*d* and travels along the lower rail 20*d*. An upper end portion of the second mast 22 is supported by the upper rail 20*u*.

The area where the second stacker crane 2 can transport the articles 9 in the up-down direction Z corresponds to the area in the up-down direction Z occupied by the second rack S2. Specifically, the area where the second body 23 supporting the second transfer unit 25 can move in the up-down direction Z depends on the dimension of the second mast 22 in the up-down direction Z. The dimension of the second mast 22 in the up-down direction Z corresponds to the area in the up-down direction Z occupied by the second rack S2. Thus, the area where the second stacker crane 2 can transport the articles 9 in the up-down direction Z corresponds to the area in the up-down direction Z occupied by the second rack S2.

In the example shown in FIG. 2, the area where the second stacker crane 2 can transport the articles 9 in the first direction X corresponds to the area in the first direction X occupied by the second rack S2. Specifically, the area where the second body 23 supporting the second transfer unit 25 can move in the first direction X depends on the dimension of the second travel rail 20 in the first direction X. The dimension of the second travel rail 20 in the first direction X corresponds to the area in the first direction X occupied by the second rack S2. Thus, the area where the second stacker crane 2 can transport the articles 9 in the first direction X corresponds to the area in the first direction X occupied by the second rack S2.

Next, the transfer of the articles 9 will be described. The first stacker crane 1 can transfer the articles 9 to some of the accommodation sections Sa in the storage rack S and transfer the articles 9 to the first accommodation sections S1*a* in the first rack S1. The second stacker crane 2 can transfer the articles 9 to some of the accommodation sections Sa in the storage rack S and transfer the articles 9 to the second accommodation sections S2*a* in the second rack S2.

Figure 3:
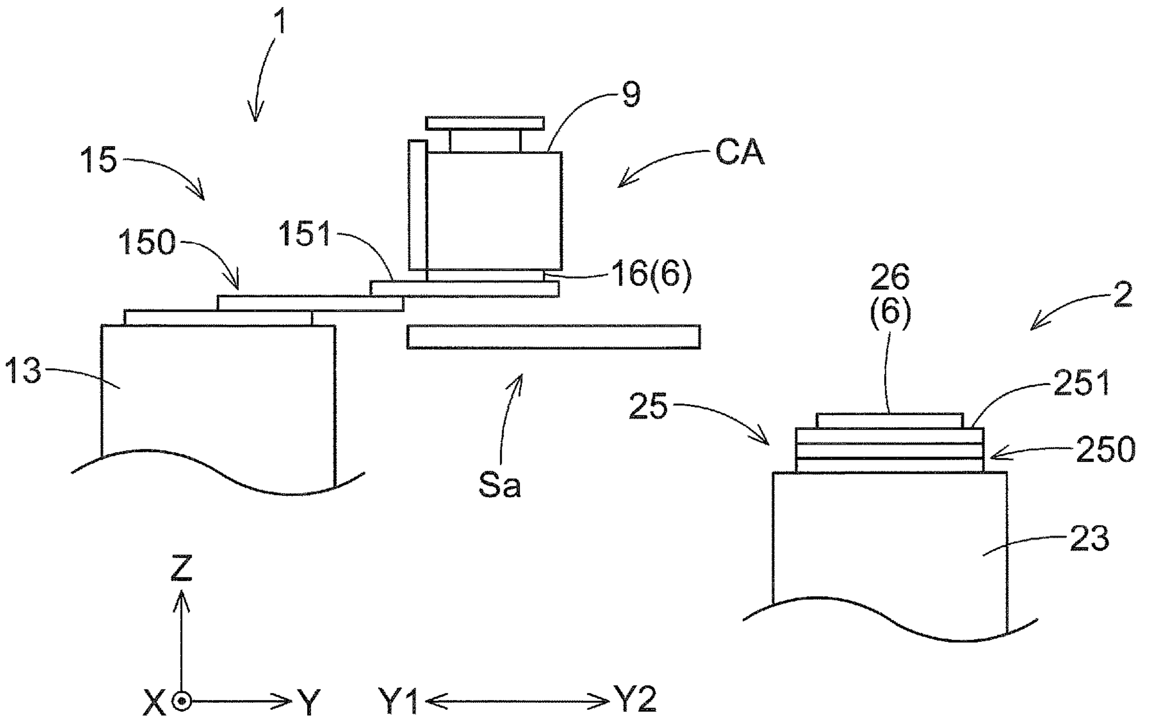
FIG. 3 is a diagram illustrating an article being transferred.

A structure for the first stacker crane 1 and the second stacker crane 2 to transfer the articles 9 will be described with reference to FIG. 3. Note that FIG. 3 shows the first stacker crane 1 transferring an article 9 to an accommodation section Sa in the storage rack S. The transfer of an article 9 to an accommodation section Sa by the second stacker crane 2, the transfer to a first accommodation section S1*a* by the first stacker crane 1, and the transfer to a second accommodation section S2*a* by the second stacker crane 2 are the same as the transfer shown in FIG. 3.

The first stacker crane 1 transfers the article 9 with the first transfer unit as shown in FIG. 3. Here, “transferring an article” refers to a concept that includes both delivering an article 9 to a transfer point (any of the accommodation sections Sa in the example shown in FIG. 3) and receiving an article 9 from a transfer point.

The first transfer unit 15 in this embodiment has an arm 150 that is extendable in a horizontal direction (here, the second direction Y), and a support 151, such as a fork, located at an end of the arm 150. For example, the arm 150 is a SCARA (Selective Compliance Assembly Robot Arm). The support 151 supports an article 9 from below.

Although not shown in detail, each accommodation section Sa in this embodiment has a loading plate with an opening through which the support 151 can pass in the up-down direction Z. The first transfer unit 15 places the article 9 on the loading plate by having the support 151 pass downward through the opening in the loading plate from above while the support 151 is supporting the article 9. The first transfer unit 15 thus delivers the article 9 to the accommodation section Sa. Also, the first transfer unit 15 has the support 151 support the article 9 by having the support 151 pass upward through the opening in the loading plate from below while the loading plate is supporting the article 9. The first transfer unit 15 thus receives the article 9 from the accommodation section Sa. Note that the support 151 is raised and lowered by the first elevation unit 14 (see FIG. 4) raising and lowering the first body 13.

The second stacker crane 2 has the same transfer structure as that of the first stacker crane 1. That is, the second stacker crane 2 transfers an article 9 with the second transfer unit 25. The second transfer unit 25 has an arm 250 that is extendable in a horizontal direction (here, the second direction Y), and a support 251, such as a fork, located at an end of the arm 250. The detailed structure of the second transfer unit 25 is the same as the above-described structure of the first transfer unit 15, and a description thereof is omitted.

Here, there are cases where the position of the article 9 in the accommodation section Sa is limited to a predetermined proper position, depending on, for example, the structure of the article 9 and the structure of the accommodation section Sa that receives the article 9. In this embodiment, at least either the first stacker crane 1 or the second stacker crane 2 has a position change mechanism 6 that changes the position of the article 9 as viewed in the up-down direction Z. Thus, the position change mechanism 6 can change the position of the article 9 as viewed in the up-down direction Z in accordance with the proper position of the article 9 at a corresponding transfer point.

In this embodiment, both the first stacker crane 1 and the second stacker crane 2 have the position change mechanism 6. Specifically, the first stacker crane 1 has a first turner 16 serving as the position change mechanism 6. The second stacker crane 2 has a second turner 26 serving as the position change mechanism 6.

The first turner 16 is located on the support 151 of the first transfer unit 15, and changes the position of the article 9 supported by the support 151. The second turner 26 is located on the support 251 of the second transfer unit 25, and changes the position of the article 9 supported by the support 251. For example, the first turner 16 and the second turner 26 are each constituted by a turning table that rotates around an axis in the up-down direction Z.

Figure 4:
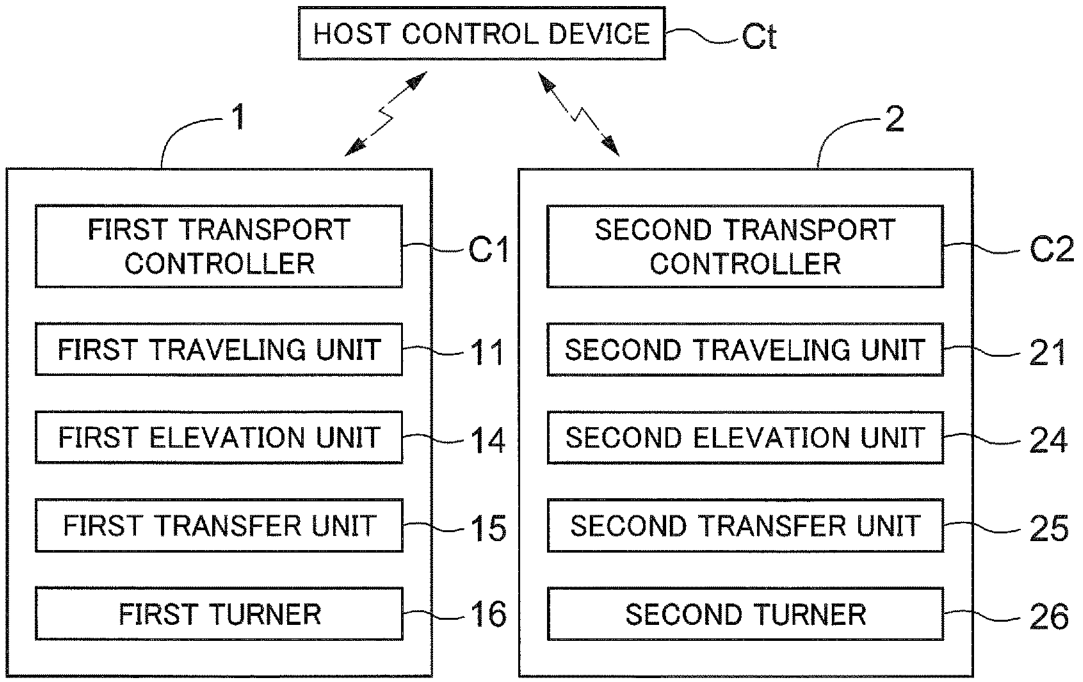
FIG. 4 is a control block diagram.

The article accommodation facility 100 in this embodiment includes a host control device Ct that controls the first stacker crane 1 and the second stacker crane 2, as shown in FIG. 4. The host control device Ct corresponds to a “control device”.

The first stacker crane 1 in this embodiment has a first transport controller C1 that controls the operations of units of the first stacker crane 1. The first transport controller C1 controls the first traveling unit 11, the first elevation unit 14, and the first transfer unit 15. The first transport controller C1 in this embodiment also controls the first turner 16 in addition to the above.

The second stacker crane 2 has a second transport controller C2 that controls the operations of units of the second stacker crane 2. The second transport controller C2 controls the second traveling unit 21, the second elevation unit 24, and the second transfer unit 25. The second transport controller C2 in this embodiment also controls the second turner 26 in addition to the above.

The host control device Ct is capable of communicating with the first transport controller C1 and the second transport controller C2. For example, the host control device Ct transmits transport commands, each of which specifies a transport origin and a transport destination of an article 9, to the first transport controller C1 and the second transport controller C2. The first transport controller C1, upon receiving a transport command, controls units of the first stacker crane 1 to transport the article 9 based on the transport command. Similarly, the second transport controller C2, upon receiving a transport command, controls units of the second stacker crane 2 to transport the article 9 based on the transport command.

The host control device Ct, the first transport controller C1, and the second transport controller C2 each include, for example, a processor such as a microcomputer and peripheral circuits such as a memory. Each type of processing or each function is realized by cooperation of these pieces of hardware and a program executed on a processor such as a computer.

Figure 5:
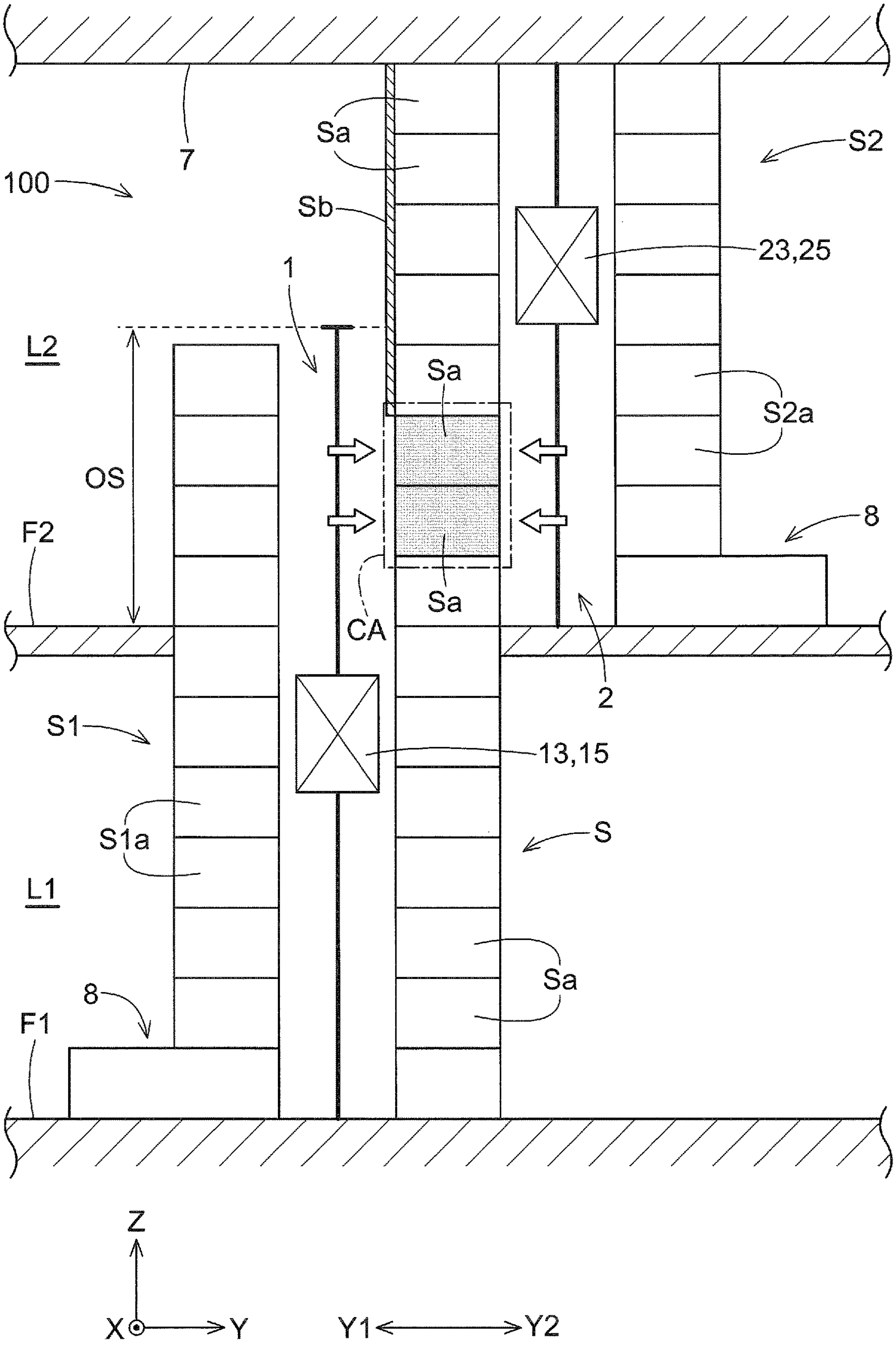
FIG. 5 is a diagram illustrating a common area.

Here, the storage rack S has a common area CA that includes at least one accommodation section Sa to and from which an article 9 can be carried from both sides in the second direction Y, as shown in FIG. 5. The common area CA is located in an overlapping region OS where the transportable area in which the first stacker crane 1 can transport the article 9 and the transportable area in which the second stacker crane 2 can transport the article 9 overlap as viewed in the second direction Y.

The first stacker crane 1 is capable of transferring the article 9 to the accommodation section Sa in the common area CA from the first side Y1 in the second direction Y. The second stacker crane 2 is capable of transferring the article 9 to the accommodation section Sa in the common area CA from the second side Y2 in the second direction Y.

This allows the first stacker crane 1 and the second stacker crane 2 to pass the article 9 to and from each other and transport the article 9 between different levels, namely the levels L1 and L2, via the accommodation section Sa in the common area CA. The transportable area in which the first stacker crane 1 can transport the article 9 and the transportable area in which the second stacker crane 2 can transport the article 9 are located at different positions in the second direction Y and do not overlap each other. Thus, the first stacker crane 1 and the second stacker crane 2 do not interfere with each other outside the accommodation section Sa in the common area CA, thus reducing constraints on the operation of the first stacker crane 1 and the second stacker crane 2. This makes it easier to increase the efficiency of transporting the article 9 with the first stacker crane 1 and the second stacker crane 2.

At least either the first stacker crane 1 or the second stacker crane 2 (both in this example) has the position change mechanism 6 that changes the position of the article 9 as viewed in the up-down direction Z (see FIG. 3), as mentioned above. For example, there are cases where a proper supported position of the article 9 while being supported is defined for each of the first stacker crane 1 and the second stacker crane 2. In this case, the first stacker crane 1 can change the position of the article 9 to the proper supported position with the position change mechanism 6 if the position of the article 9 received from an accommodation section Sa in the common area CA is not the proper supported position. While the first stacker crane 1 is delivering the article 9 to the accommodation section Sa in the common area CA, the first stacker crane 1 can change the position of the article 9 to the proper supported position corresponding to the second stacker crane 2 with the position change mechanism 6, for the second stacker crane 2 that is to receive the article 9 from the accommodation section Sa after the delivery. The second stacker crane 2 can also change the position of the article 9 in the same manner as above.

The common area CA in this embodiment includes a plurality of accommodation sections Sa. This allows the first stacker crane 1 and the second stacker crane 2 to pass the article 9 to and from each other in each of the accommodation sections Sa in the common area CA. Accordingly, the efficiency of transporting the article 9 between the first level L1 and the second level L2 can be further increased.

The common area CA in this embodiment is located above the second floor F2. This allows for a configuration in which the first stacker crane 1 and the second stacker crane 2 can pass the article 9 to and from each other without the need for the transportable area of the second stacker crane 2 in the up-down direction Z to be expanded downward from the second floor F2. The first stacker crane 1 in this embodiment extends across the first level L1 and the second level L2 since the common area CA is disposed above the second floor F2. Meanwhile, the second stacker crane 2 in this embodiment is disposed only at the second level L2. Specifically, the first mast 12 extends from the first floor F1 to a position above the second floor F2, and thus the transportable area in the up-down direction Z where the first stacker crane 1 can transport the article 9 is expanded to a position above the second floor F2, as mentioned above. Meanwhile, the second mast 22 stands upright on the second floor F2, and thus, the transportable area in the up-down direction Z where the second stacker crane 2 can transport the article 9 is not present below the second floor F2, but only present above the second floor F2. Accordingly, the transportable areas where the stacker cranes 1 and 2 can transport the article 9 are both present above the second floor F2. Thus, due to the common area CA being disposed above the second floor F2, the first stacker crane 1 and the second stacker crane 2 can pass the article 9 to and from each other in any of the accommodation sections Sa included in the common area CA.

The storage rack S in this embodiment includes a transfer restriction section Sb that restricts the transfer of the article 9 by the first stacker crane 1 or the second stacker crane 2, in a region that is within the overlapping region OS, where the transportable area in which the first stacker crane 1 can transport the article 9 and the transportable area in which the second stacker crane 2 can transport the article 9 overlap as viewed in the second direction Y, and furthermore is outside the common area CA. The transfer restriction section Sb in this example is a wall covering the first side Y1 of the storage rack S in the second direction Y in a range that is within the overlapping region OS and outside the common area CA, and restricts the transfer of the article 9 by the first stacker crane 1 in the region where the transfer restriction section Sb is disposed. This makes it impossible for the first stacker crane 1 and the second stacker crane 2 to pass the article 9 to and from each other in the accommodation sections Sa other than those in the common area CA.

The host control device Ct (see FIG. 4) in this embodiment controls the transfer operation of the first stacker crane 1 and the second stacker crane 2 in such a manner that the first stacker crane 1 and the second stacker crane 2 do not simultaneously transfer articles 9 to the same accommodation section Sa in the common area CA. This makes it possible to avoid interference between the first stacker crane 1 and the second stacker crane 2 while transferring the articles 9. The host control device Ct in this example controls the transfer operation of the first stacker crane 1 via the first transport controller C1, and controls the transfer operation of the second stacker crane 2 via the second transport controller C2 (see FIG. 4).

According to the above-described article accommodation facility 100, the articles 9 can be transported between different levels L1 and L2 in the up-down direction Z and accommodated in any of the accommodation sections (Sa, S1*a*, S2*a*) at different levels, with fewer restrictions on the article transport operations.

Second Embodiment

Next, a second embodiment of the article accommodation facility 100 will be described with reference to FIG. 6. Differences from the first embodiment will be mainly described below. The points that are not particularly described are the same as the first embodiment.

Figure 6:
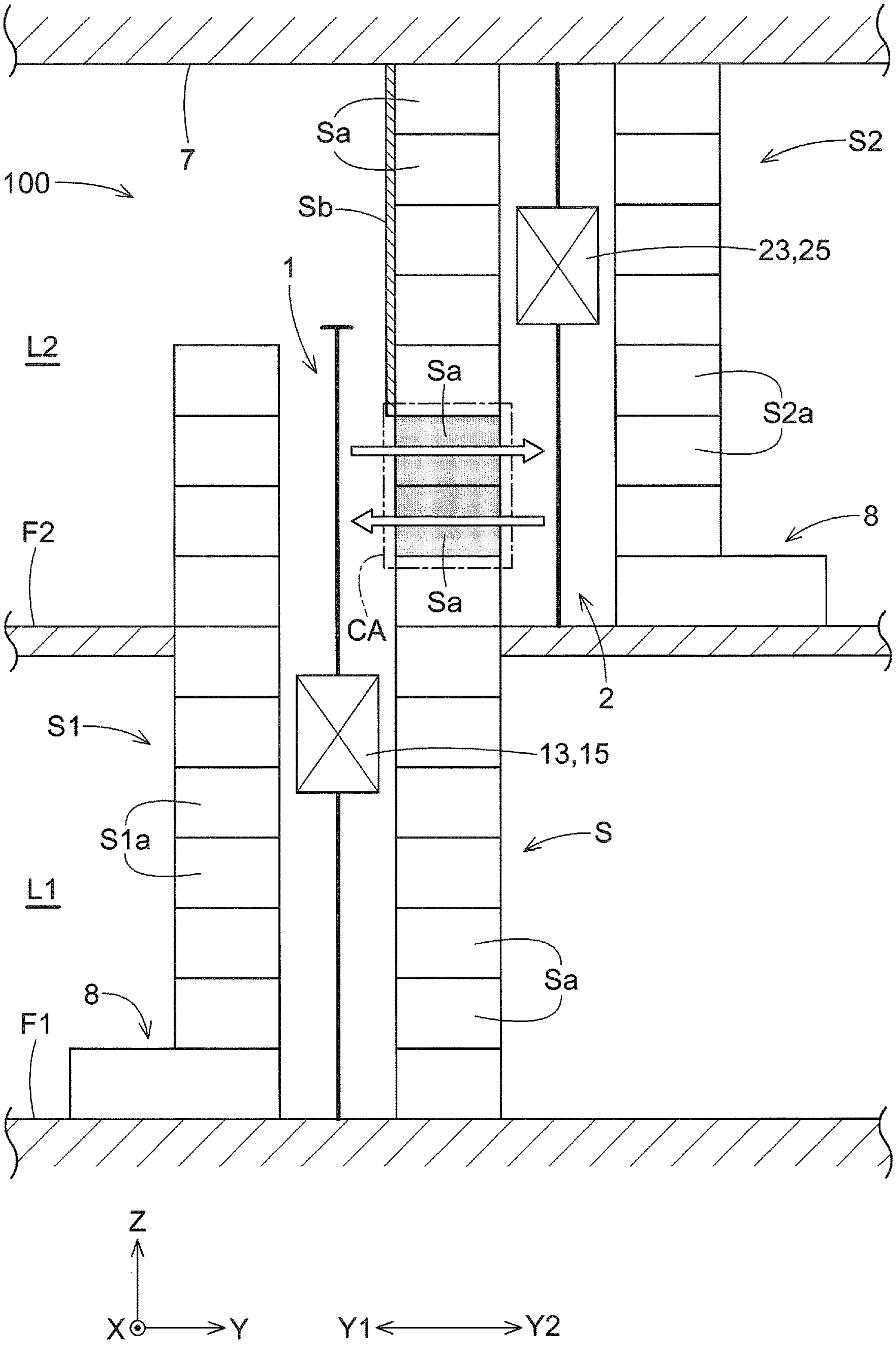
FIG. 6 is a diagram illustrating a common area according to a second embodiment.

The common area CA in this embodiment includes a plurality of accommodation sections Sa as shown in FIG. 6, like the first embodiment.

In this embodiment, some of the accommodation sections Sa included in the common area CA serve as accommodation sections Sa each dedicated to relaying the article 9 to be passed from the first stacker crane 1 to the second stacker crane 2, and the other accommodation sections Sa each serve as an accommodation section Sa dedicated to relaying the article 9 to be passed from the second stacker crane 2 to the first stacker crane 1.

That is, some of the accommodation sections Sa included in the common area CA are accommodation sections Sa each dedicated to receiving the article 9 from the first stacker crane 1 and delivering the article 9 to the second stacker crane 2. Meanwhile, the other accommodation sections Sa included in the common area CA are accommodation sections Sa each dedicated to receiving the article 9 from the second stacker crane 2 and delivering the article 9 to the first stacker crane 1. In other words, the direction in which the article 9 is transported is determined as one direction in each of the accommodation sections Sa included in the common area CA.

According to this embodiment, articles 9 can be prevented from being simultaneously delivered to one accommodation section Sa in the common area CA, and an article 9 in one accommodation section Sa in the common area CA can be prevented from being simultaneously received by the first stacker crane 1 and the second stacker crane 2.

Further, the first embodiment has described a configuration where the host control device Ct controls the transfer operation of the first stacker crane 1 and the second stacker crane 2 in such a manner that the first stacker crane 1 and the second stacker crane 2 do not simultaneously transfer articles 9 to one accommodation section Sa in the common area CA. In contrast, according to the second embodiment, each accommodation section Sa in the common area CA has a dedicated function as described above, thus eliminating the need to perform control to prohibit simultaneous transfer as in the first embodiment, or simplifying the control configuration in the case of performing this type of prohibition control.

Third Embodiment

Next, a third embodiment of the article accommodation facility 100 will be described with reference to FIG. 7. Differences from the first embodiment will be mainly described below. The points that are not particularly described are the same as the first embodiment.

Figure 7:
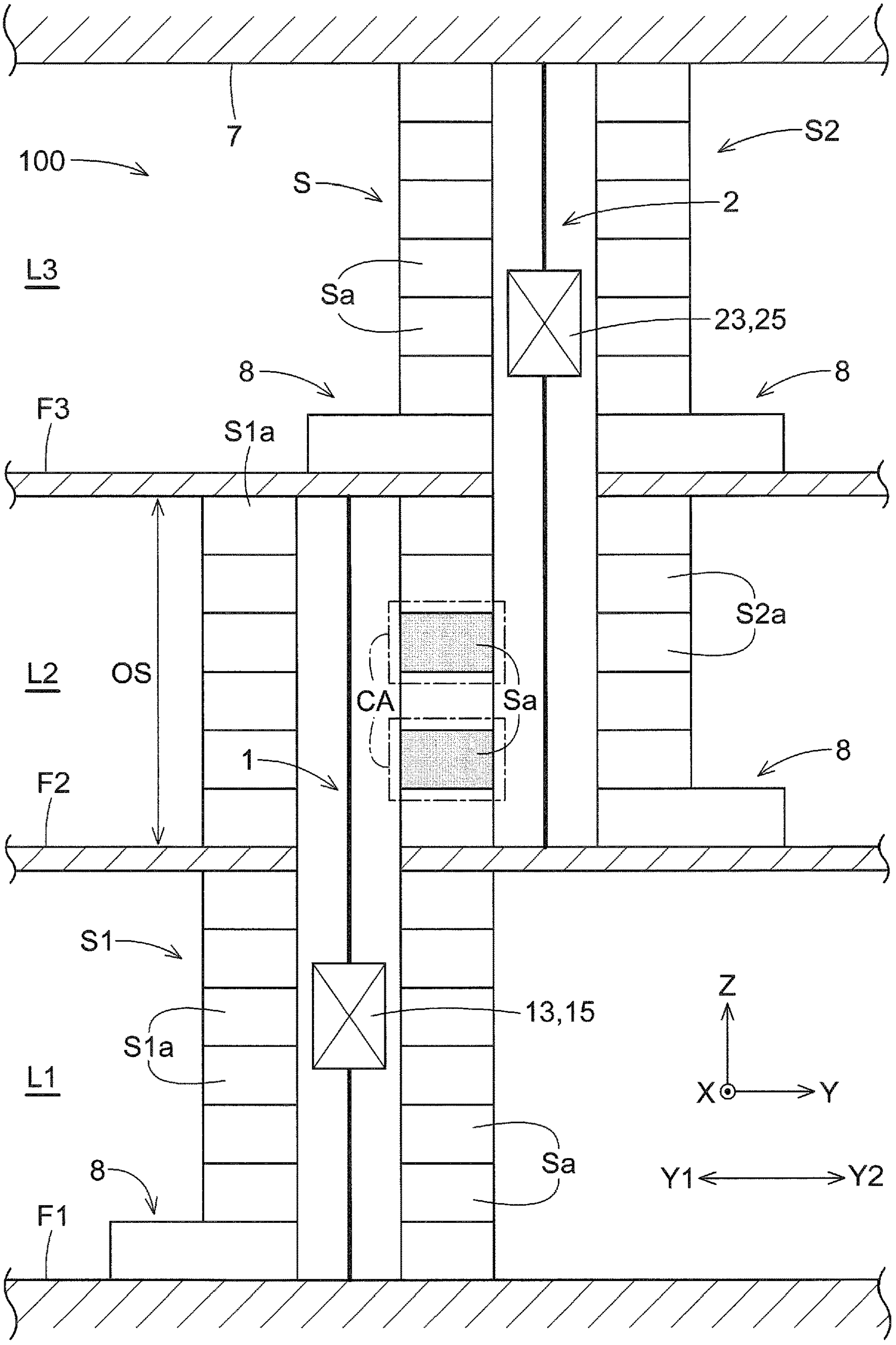
FIG. 7 is a schematic side view of an article accommodation facility according to a third embodiment.

In this embodiment, the building has a third floor F3, which is a floor at a third level L3 above the second level L2, as shown in FIG. 7.

The first stacker crane 1 in this embodiment extends across the first level L1 and the second level L2. The second stacker crane 2 extends across the second level L2 and the third level L3. The storage rack S extends across the first level L1, the second level L2, and the third level L3. The first rack S1 in this embodiment extends across the first level L1 and the second level L2. The second rack S2 extends across the second level L2 and the third level L3. In the example shown in FIG. 7, the loading and unloading section 8 is disposed at each of the levels L1 to L3. The loading and unloading section 8 connected to the storage rack S may also be disposed in addition to the loading and unloading section 8 connected to the first rack S1 and the loading and unloading section 8 connected to the second rack S2, as shown in FIG. 7.

The common area CA in this embodiment is located in a portion of the storage rack S at the second level L2. According to this embodiment, the article 9 received or delivered in any of the accommodation section Sa in the common area CA at the second level L2 can be transported to the first level L1 by the first stacker crane 1, or to the third level L3 by the second stacker crane 2. Accordingly, a large transportable area for the articles 9 across the first to third levels L1 to L3 can be secured.

According to this embodiment, it is possible to secure the large overlapping region OS where the transportable area in which the first stacker crane 1 can transport the article 9 and the transportable area in which the second stacker crane 2 can transfer the article 9 overlap as viewed in the second direction Y. This allows for a large common area CA in the overlapping region OS, or a plurality of common areas CA. In the example shown in FIG. 7, a plurality of common areas CA are disposed at positions separated from each other.

Other Embodiments

Next, other embodiments of the article accommodation facility will be described.

Figure 8:
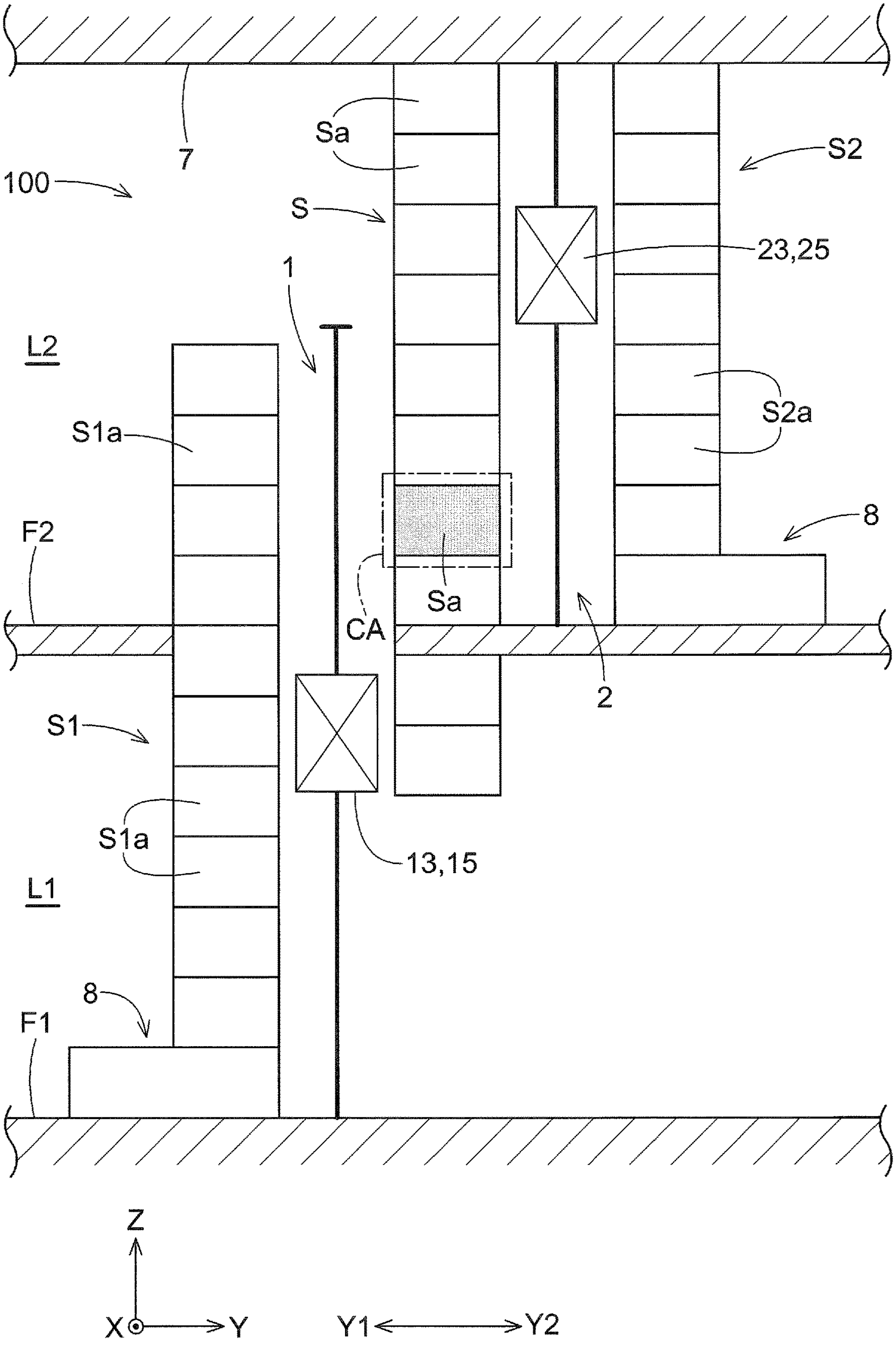
FIG. 8 is a schematic side view of an article accommodation facility according to another embodiment.

(1) The above embodiments have described examples where the storage rack S stands upward on the first floor F1. However, without being limited to this example, the storage rack S may, for example, include a portion supported and suspended downward from the second floor F2 and a portion standing upward on the second floor F2, as shown in FIG. 8. In this case, the storage rack S need not stand upright on the first floor F1.

(2) The above embodiments have described examples where the storage rack S extends through the second floor F2 in the up-down direction. However, without being limited to this example, the storage rack S may be, for example, divided by the second floor F2 into a portion above the second floor F2 and a portion below the second floor F2, as shown in FIG. 8.

Figure 9:
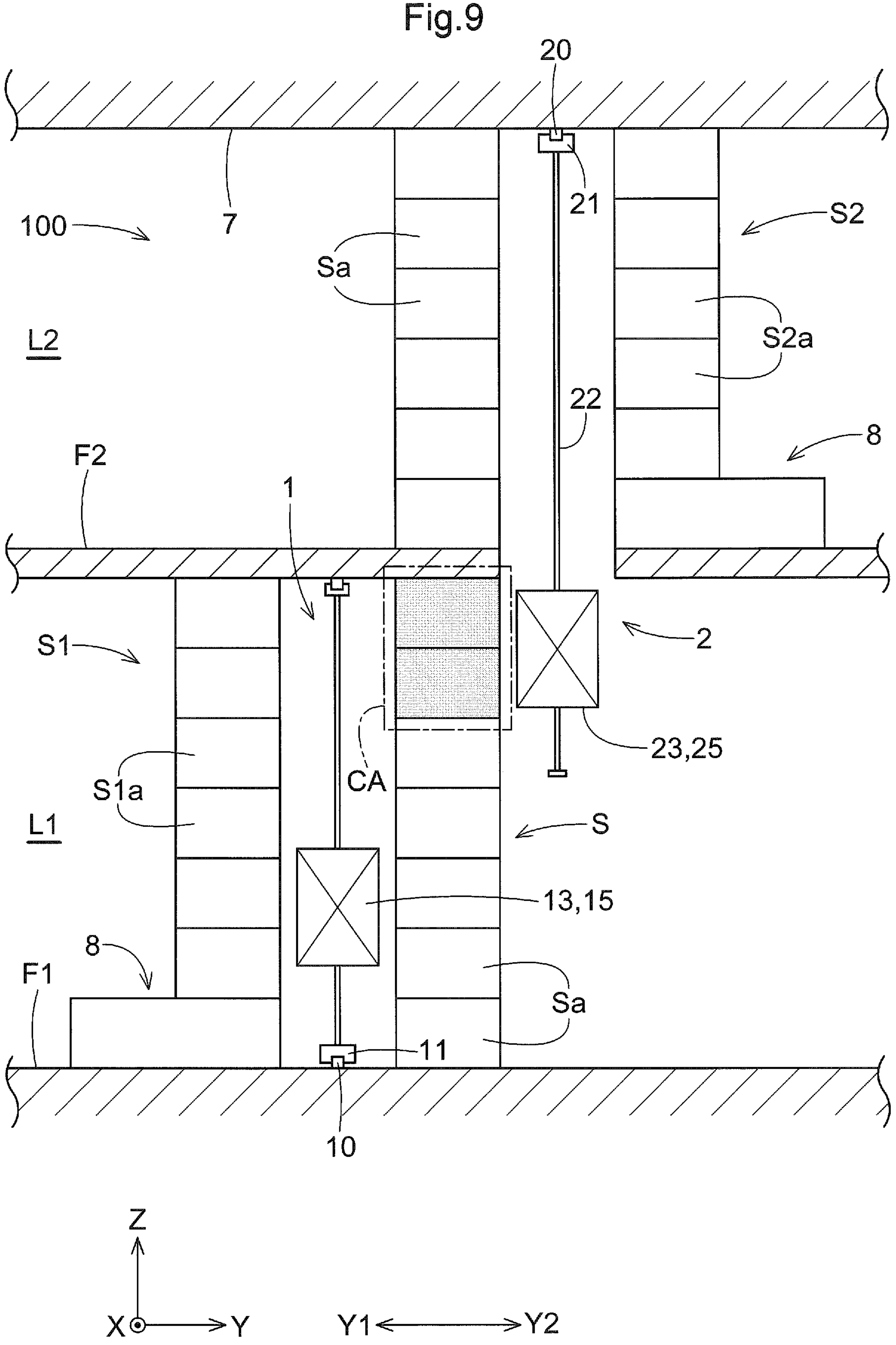
FIG. 9 is a schematic side view of an article accommodation facility according to another embodiment.

(3) The above embodiments have described examples where the second stacker crane 2 is supported by the second floor F2. However, without being limited to this example, the second stacker crane 2 may be, for example, configured as a suspended stacker crane that is suspended from the ceiling 7, as shown in FIG. 9. In this case, the second travel rail 20 is installed on the ceiling 7, and the second traveling section 21 is supported by the second travel rail 20. According to the second stacker crane 2 of this suspended type, the transportable area in which the second stacker crane 2 can transport the article 9 can further be extended downward from the second floor F2. Note that the first stacker crane 1 need not extend through the second floor F2 in the up-down direction Z as in the above embodiment, and may alternatively be supported by a ceiling portion of the second floor F2, as shown in FIG. 9.

(4) The above embodiments have described examples where the common area CA is located above the second floor F2. However, without being limited to this example, the common area CA may alternatively be, for example, located below the second floor F2, as shown in FIG. 9. A configuration can easily be realized in which the common area CA is disposed below the second floor F2 due to the transportable area in which the second stacker crane 2 can transport the article 9 being extended downward from the second floor F2 with the second stacker crane 2 of the suspended type shown in FIG. 9. The second stacker crane 2 in the example shown in FIG. 9 extends across the first level L1 and the second level L2 since the common area CA is thus disposed below the second floor F2. Meanwhile, the first stacker crane 1 in the example shown in FIG. 9 is disposed only at the first level L1. Note that the location of the common area CA can be determined in any manner, and may be disposed adjacent to the upper or lower side of the second floor F2, or separated upward or downward from the second floor F2. Alternatively, the common area CA may extend both above and below the second floor F2. In this case, both the first stacker crane 1 and the second stacker crane 2 extend across the first level L1 and the second level L2.

Figure 10:
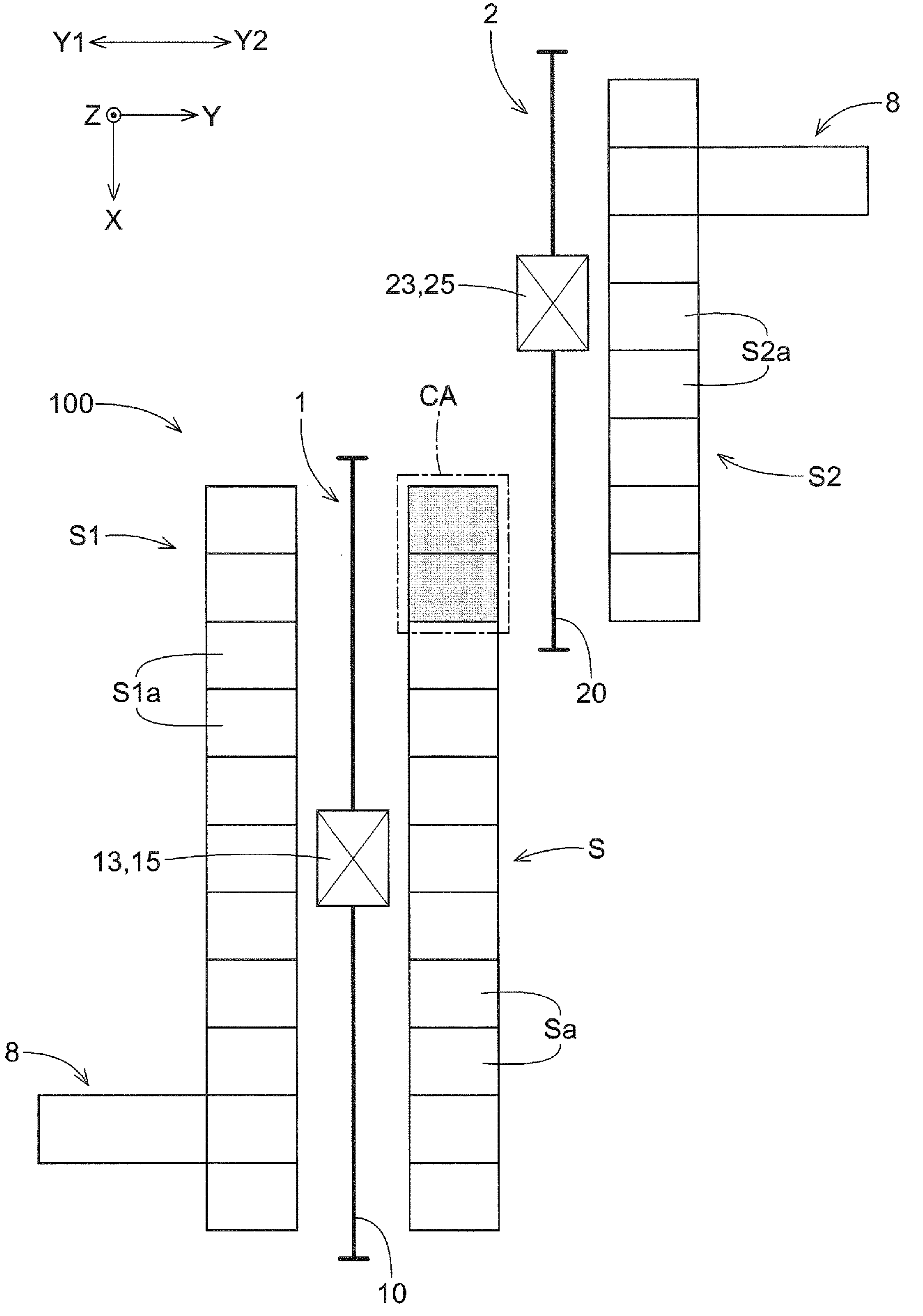
FIG. 10 is a schematic plan view showing an article accommodation facility according to another embodiment.

(5) The above embodiments have described examples where the first rack S1, the storage rack S, and the second rack S2 are equal in terms of the size of the area in the first direction X occupied by each rack. However, without being limited to this example, the first rack S1, the storage rack S, and the second rack S2 may be disposed in different areas in the first direction X. For example, a configuration may be employed where the size of the area in the first direction X occupied by the first rack S1 is equal to the area in the first direction X occupied by the storage rack S, and the area in the first direction X occupied by the second rack S2 is shifted in the first direction X, as shown in FIG. 10. The relative positional relationship in the first direction X between the above three racks is not limited to the example shown in FIG. and may be configured in any manner. Meanwhile, the areas in the first direction X where the first rack S1, the storage rack S, and the second rack S2 are disposed overlap at least partially, as shown in FIG. 10. The common area CA is set in the overlapping area.

(6) The above embodiments have described examples in which at least either the first stacker crane 1 or the second stacker crane 2 has the position change mechanism 6 that changes the position of the article 9 as viewed in the up-down direction Z. However, without being limited to this example, the position change mechanism 6 may be provided at any portion other than the first stacker crane 1 and the second stacker crane 2. For example, the position change mechanism 6 may be provided in any of the accommodation sections Sa in the common area CA or in any of the loading and unloading sections 8.

(7) The configurations disclosed in the above embodiment can also be applied in combination with configurations disclosed in other embodiments, as long as no contradictions arise. Regarding other configurations as well, the embodiments disclosed in this specification are merely examples in all respects. Therefore, various changes can be made as appropriate without departing from the scope of the present disclosure.

Summary of the Above Embodiments

The above article accommodation facility will be described below.

An article accommodation facility is to be installed in a building having a first floor, which is a floor at a first level, and a second floor, which is a floor at a second level above the first level, and the article accommodation facility comprises:

- a first stacker crane disposed at the first level;
- a second stacker crane disposed at the second level; and
- a storage rack including a plurality of accommodation sections arranged in a first direction, which is parallel to a horizontal direction, and in an up-down direction, each of the accommodation sections being capable of accommodating an article,
- wherein the storage rack extends across the first level and the second level,
- the first stacker crane is on a first side relative to the storage rack in a second direction, the first side in the second direction being one side in the second direction orthogonal to the first direction as viewed in the up-down direction,
- the second stacker crane is on a second side relative to the storage rack in the second direction, the second side in the second direction being another side in the second direction,
- the storage rack has a common area that includes at least one accommodation section, of the plurality of accommodation sections, to and from which the article is carriable from the first side and the second side in the second direction,
- the first stacker crane is configured to transfer the article to the at least one accommodation section in the common area from the first side in the second direction, and
- the second stacker crane is configured to transfer the article to the at least one accommodation section in the common area from the second side in the second direction.

According to this configuration, a transportable area of the first stacker crane, which is the area where the first stacker crane can transport the article, and the transportable area of the second stacker crane, which is the area where the second stacker crane can transport the article, are located at different positions in the second direction, and do not overlap each other. Thus, interference does not occur between the first stacker crane and the second stacker crane outside of the accommodation section in the common area, and constraints on the operation of the first stacker crane and the second stacker crane can be reduced. This allows the article transport efficiency of the first stacker crane and the second stacker crane to be easily increased. In this configuration, the first stacker crane can transfer the article to the accommodation section in the common area of the storage rack from the first side in the second direction, and the second stacker crane can transfer the article to the accommodation section in the common area of the storage rack from the second side in the second direction. This enables the first stacker crane and the second stacker crane to pass the article to and from each other, transport the article across different levels, and accommodate the article in any of the accommodation sections at different levels, via the accommodation section in the common area. Here, the first stacker crane and the second stacker crane can transport the article not only in the up-down direction but also in the first direction. The storage rack including a plurality of accommodation sections arranged in the first direction in addition to the up-down direction makes it easier to accommodate more articles in the storage rack than in conventional examples. As described above, this configuration enables the article to be transported across different levels and accommodated in any of the accommodation sections at different levels while reducing constraints on the operation of the first stacker crane and the second stacker crane.

It is preferable that the storage rack stands upward on the first floor and extends through the second floor in the up-down direction.

According to this configuration, the common area of the storage rack can be easily set at a position where the transportable areas of the first stacker crane and the second stacker crane in the up-down direction overlap.

It is preferable that the common area is above the second floor.

According to this configuration, the transportable area of the second stacker crane in the up-down direction need not be expanded downward from the second floor, and a configuration can be realized that allows the first stacker crane and the second stacker crane to pass the article to and from each other.

It is preferable that the building further has a third floor, which is a floor at a third level above the second level, the first stacker crane extends across the first level and the second level, the second stacker crane extends across the second level and the third level, the storage rack extends across the first level, the second level, and the third level, and the storage rack has the common area at a portion at the second level.

According to this configuration, a large transportable area for the article across the first to third levels can be secured.

It is preferable that the article accommodation facility further comprises:

a first rack including a plurality of first accommodation sections arranged in the first direction and the up-down direction, each of the first accommodation sections being capable of accommodating the article; and a second rack including a plurality of second accommodation sections arranged in the first direction and the up-down direction, each of the second accommodation sections being capable of accommodating the article, wherein the first rack is on the first side relative to the first stacker crane in the second direction, the second rack is on the second side relative to the second stacker crane in the second direction, the first stacker crane is configured to transfer the article to the first accommodation sections in the first rack from the second side in the second direction, and the second stacker crane is configured to transfer the article to the second accommodation sections in the second rack from the first side in the second direction.

According to this configuration, the overall capacity to accommodate articles in the facility can be increased in the range where the first stacker crane or the second stacker crane can transport the article.

It is preferable that the article accommodation facility further comprises:

a control device configured to control the first stacker crane and the second stacker crane, wherein the control device controls transfer operation of the first stacker crane and the second stacker crane in such a manner that the first stacker crane and the second stacker crane do not simultaneously transfer the article to one same accommodation section among the accommodation sections in the common area.

According to this configuration, the first stacker crane and the second stacker crane can be prevented from interfering with each other while transferring the article.

It is preferable that the at least one accommodation section included in the common area includes a plurality of accommodation sections, and one or more of the accommodation sections included in the common area is dedicated to relaying the article to be passed from the first stacker crane to the second stacker crane, and another one or more of the accommodation sections in the common area is dedicated to relaying the article to be passed from the second stacker crane to the first stacker crane.

According to this configuration, it is possible to prevent articles from being simultaneously delivered to one accommodation section in the common area by both the first and second stacker cranes, and prevent articles in one accommodation section in the common area from being simultaneously received by both the first and the second stacker cranes.

It is preferable that at least either the first stacker crane or the second stacker crane includes a position change mechanism configured to change a position of the article as viewed in the up-down direction.

According to this configuration, the position change mechanism can change the position of the article as viewed in the up-down direction. For example, there are cases where the position of the article in the accommodation section is limited to a predetermined proper position, depending on, for example, the structure of the article or the structure of the accommodation section that receives the article. Even in such a case, according to this configuration, the position change mechanism in at least either the first stacker crane or the second stacker crane can change the position of the article, thus allowing the article to be properly delivered to or received from the accommodation section in the common area from both sides in the second direction.

INDUSTRIAL APPLICABILITY

The technology of the present disclosure can be used in an article accommodation facility to be installed in a building that has a first floor, which is a floor at a first level, and a second floor, which is a floor at a second level above the first level.

What is claimed is:

1. An article accommodation facility to be installed in a building having a first floor, which is a floor at a first level, and a second floor, which is a floor at a second level above the first level, the article accommodation facility comprising:

a first stacker crane disposed at the first level;

a second stacker crane disposed at the second level;

a storage rack comprising a plurality of accommodation sections arranged in a first direction, which is parallel to a horizontal direction, and in an up-down direction, each of the accommodation sections capable of accommodating an article; and a control device configured to control the first stacker crane and the second stacker crane, wherein:

the storage rack extends across the first level and the second level, the first stacker crane is on a first side relative to the storage rack in a second direction, the first side in the second direction is one side in the second direction orthogonal to the first direction as viewed in the up-down direction, the second stacker crane is on a second side relative to the storage rack in the second direction, the second side in the second direction is another side in the second direction, the storage rack has a common area that comprises at least one accommodation section, of the plurality of accommodation sections, to and from which the article is carriable from the first side and the second side in the second direction, the first stacker crane is configured to transfer the article to the at least one accommodation section in the common area from the first side in the second direction, the second stacker crane is configured to transfer the article to the at least one accommodation section in the common area from the second side in the second direction, and the control device controls transfer operation of the first stacker crane and the second stacker crane in such a manner that the first stacker crane and the second stacker crane do not simultaneously transfer the article to one same accommodation section among the accommodation sections in the common area.

2. The article accommodation facility according to claim 1, wherein the storage rack stands upward on the first floor and extends through the second floor in the up-down direction.

3. The article accommodation facility according to claim 2, wherein the common area is above the second floor.

4. The article accommodation facility according to claim 1, wherein:

the building further has a third floor, which is a floor at a third level above the second level, the first stacker crane extends across the first level and the second level, the second stacker crane extends across the second level and the third level, the storage rack extends across the first level, the second level, and the third level, and the storage rack has the common area at a portion at the second level.

5. The article accommodation facility according to claim 1, further comprising:

a first rack comprising a plurality of first accommodation sections arranged in the first direction and the up-down direction, each of the first accommodation sections capable of accommodating the article; and a second rack comprising a plurality of second accommodation sections arranged in the first direction and the up-down direction, each of the second accommodation sections capable of accommodating the article, wherein:

the first rack is on the first side relative to the first stacker crane in the second direction, the second rack is on the second side relative to the second stacker crane in the second direction, the first stacker crane is configured to transfer the article to the first accommodation sections in the first rack from the second side in the second direction, and the second stacker crane is configured to transfer the article to the second accommodation sections in the second rack from the first side in the second direction.

6. The article accommodation facility according to claim 1, wherein the at least one accommodation section included in the common area comprises a plurality of accommodation sections, and one or more of the accommodation sections included in the common area is dedicated to relaying the article to be passed from the first stacker crane to the second stacker crane, and another one or more of the accommodation sections in the common area is dedicated to relaying the article to be passed from the second stacker crane to the first stacker crane.

7. The article accommodation facility according to claim 1, wherein at least either the first stacker crane or the second stacker crane comprises a position change mechanism configured to change a position of the article as viewed in the up-down direction.

* * * * *